(12) United States Patent
Leeratanaphanit et al.

(10) Patent No.: US 10,892,495 B2
(45) Date of Patent: Jan. 12, 2021

(54) METHOD AND DEVICE FOR PREPARING A CATALYST COATED MEMBRANE

(71) Applicant: Greenerity GmbH, Hanau-Wolfgang (DE)

(72) Inventors: Sarayut Leeratanaphanit, Offenbach am Main (DE); Bernd Nollmann, Langenselbold (DE)

(73) Assignee: GREENERITY GMBH, Hanau-Wolfgang (DE)

( * ) Notice: Subject to any disclaimer, the term of this patent is extended or adjusted under 35 U.S.C. 154(b) by 342 days.

(21) Appl. No.: 15/478,481

(22) Filed: Apr. 4, 2017

(65) Prior Publication Data
US 2017/0294660 A1    Oct. 12, 2017

(30) Foreign Application Priority Data

Apr. 6, 2016 (EP) ..................................... 16163977

(51) Int. Cl.
*H01M 4/88* (2006.01)
*H01M 8/1004* (2016.01)
(Continued)

(52) U.S. Cl.
CPC ....... *H01M 4/8828* (2013.01); *H01M 4/8657* (2013.01); *H01M 4/881* (2013.01);
(Continued)

(58) Field of Classification Search
CPC ............. H01M 4/8828; H01M 4/8657; H01M 4/8807; H01M 4/881; H01M 4/8814;
(Continued)

(56) References Cited

U.S. PATENT DOCUMENTS

| | | | | |
|---|---|---|---|---|
| 5,879,828 A | * | 3/1999 | Debe ...................... | B82Y 15/00 429/483 |
| 2004/0036394 A1 | * | 2/2004 | Hamrock ............... | B01D 69/12 313/30 |

(Continued)

OTHER PUBLICATIONS

European Patent Office Communication, dated Aug. 9, 2016, in EP16163977.8.

*Primary Examiner* — Michael N Orlando
*Assistant Examiner* — Elizabeth Bradford
(74) *Attorney, Agent, or Firm* — Levin Santalone LLP; John Santalone

(57) ABSTRACT

The present invention concerns a method for preparing a catalyst coated membrane including the steps of:
  coating a substrate with a first catalyst dispersion thereby obtaining a first catalyst dispersion coated substrate,
  providing a second side of a membrane with a support film,
  coating a first side of the membrane with a second catalyst dispersion, thereby obtaining a second catalyst dispersion coated first side of the membrane,
  drying the first catalyst dispersion thereby obtaining a first catalyst coated substrate or drying the second catalyst dispersion coated first side of the membrane thereby obtaining a second catalyst coated first side of the membrane,
  laminating the first catalyst coated substrate to the second catalyst dispersion coated first side of the membrane or laminating the first catalyst dispersion coated substrate to the second catalyst coated first side of the membrane so that the first catalyst and the second catalyst superimpose, thereby forming a laminate including a membrane comprising a first catalyst layer,
  drying the laminate,
  removing the support film from the second side of the membrane, (Continued)

coating a third catalyst dispersion on the second side of the membrane, drying the third catalyst dispersion, thereby obtaining a second catalyst layer on the membrane, and removing the substrate from the first catalyst coated substrate.

15 Claims, 6 Drawing Sheets

(51) Int. Cl.
*H01M 4/86* (2006.01)
*H01M 4/92* (2006.01)
*H01M 8/1018* (2016.01)

(52) U.S. Cl.
CPC ....... *H01M 4/8807* (2013.01); *H01M 4/8814* (2013.01); *H01M 4/8882* (2013.01); *H01M 4/926* (2013.01); *H01M 8/1004* (2013.01); *H01M 2008/1095* (2013.01)

(58) Field of Classification Search
CPC .. H01M 4/8882; H01M 4/926; H01M 8/1004; C09D 5/00
USPC ...................................... 156/272.6
See application file for complete search history.

(56) References Cited

U.S. PATENT DOCUMENTS

| | | | |
|---|---|---|---|
| 2005/0067345 A1 | 3/2005 | Prugh | |
| 2005/0233067 A1* | 10/2005 | Gascoyne | H01M 4/8605 427/115 |
| 2006/0057281 A1* | 3/2006 | Izumi | H01M 4/8882 427/115 |
| 2006/0204831 A1* | 9/2006 | Yan | H01M 4/8642 429/483 |
| 2007/0199649 A1* | 8/2007 | Sompalli | B32B 7/12 156/280 |
| 2007/0213203 A1* | 9/2007 | Sompalli | H01M 4/8657 502/101 |
| 2007/0248846 A1* | 10/2007 | Hohenthanner | H01M 8/1004 429/483 |
| 2008/0107945 A1 | 5/2008 | Coms | |
| 2009/0053583 A1* | 2/2009 | Binder | H01M 4/8807 429/490 |
| 2009/0291345 A1 | 11/2009 | Hommura | |
| 2010/0051181 A1 | 3/2010 | Mori | |
| 2016/0172701 A1* | 6/2016 | Desie | B01D 67/0088 428/220 |

\* cited by examiner

METHOD AND DEVICE FOR PREPARING A CATALYST COATED MEMBRANE

The present invention concerns a method for preparing a catalyst coated membrane and a device for manufacturing a catalyst coated membrane.

BACKGROUND OF THE INVENTION

Catalyst coated membranes are used in fuel cells in the form of membrane electrode assemblies. A membrane electrode assembly (MEA) consists of an anode gas diffusion layer (A-GDL), an anode catalyst layer (A-cl), a polymer electrolyte membrane, a cathode catalyst layer (C-cl) and a cathode gas diffusion layer (C-GDL) stacked in this order. To achieve high catalytic activity it is essential that the catalyst layers have a high surface area and good contact to the electrolyte membrane. In the preparation of a membrane electrode assembly, the catalyst layers are first provided on the gas diffusion layers and then hot pressed to the membrane. This method bears disadvantages since the catalysts when applied in a wet stage mix with the porous diffusion layers. In another approach for forming a catalyst coated membrane, catalyst layers are formed on inert temporary substrates and then transferred to the polymer electrolyte membrane. Such process requires additional temporary substrates which increases the process costs. Furthermore, such process is complicated and time intensive. In a further approach a catalyst coated membrane is prepared by coating a catalyst dispersion directly onto a membrane. The membrane may be free-standing which leads to uncontrolled dimensional changes of the membrane in particular, when using membranes of low thickness.

Patent application US2002/0064593A1 describes a continuous roll-to-roll process for producing a membrane electrode assembly (MEA). A first catalyst ink is coated directly on the first side of a polymer electrolyte membrane which is fixed with its second side to a backing film and a gas diffusion layer (GDL) is applied directly onto the still moist first catalyst layer.

Finally, the composite is dried in an oven. After removing the backing film from the second side of the polymer electrolyte membrane the second catalyst ink is coated directly onto the second side of the polymer electrolyte membrane which is still supported by the composite and finally dried. In a different way in this patent application the first catalyst ink is coated directly onto a first GDL and the first side of the polymer electrolyte membrane is applied directly onto the still moist catalyst ink layer where the second side of the polymer electrolyte membrane is fixed on its backing film. The second catalyst ink is coated directly onto a second GDL and after removing the backing film of the polymer electrolyte membrane the second side of the polymer electrolyte membrane comes into contact with the second still moist catalyst ink layer. In the examples only a thickness of the polymer electrolyte membrane of 30 µm and no thinner polymer electrolyte membranes (e.g. 10-20 µm) are described. With the process of patent application US2002/0064593A1 only a membrane electrode assembly (MEA) and no catalyst coated membrane (CCM) can be obtained which is necessary when an application of a rim material to the CCM is necessary.

Patent application EP1261058A2 describes a method for producing a membrane electrode assembly (MEA). The method comprises no continuous roll-to-roll-process where both gas diffusion layers for anode and cathode electrode are coated with the catalyst ink and finally these coated gas diffusion layers are laid with the still moist state of the electrodes to both sides of the polymer electrolyte membrane. Finally, this composite is dried in an oven. In the examples only a thickness of the polymer electrolyte membrane of 50 µm and no thinner polymer electrolyte membranes (e.g. 10-20 µm) are described. With the method of patent application EP1261058A2 only a membrane electrode assembly (MEA) and no catalyst coated membrane (CCM) can be obtained which is necessary when an application of a rim material to the CCM is necessary.

It is an object underlying the present invention to provide a method for manufacturing a catalyst coated membrane which overcomes the above captioned problems. In particular, it is the gist of the present invention to provide a method which prevents from uncontrolled dimensional changes of the membrane, like formation of wrinkles as well as formation of cracks in the catalyst layer and the like, which can be carried out easily without requiring high technology. It is a further object underlying the present invention to provide a device for manufacturing a high quality catalyst coated membrane.

SUMMARY OF THE INVENTION

The above captioned problems are solved by the present invention, which is generally directed to a method for preparing a catalyst layer which is formed of two partial catalyst layers which are joined together in a laminating step. To achieve sufficient adhesion between the two partial catalyst layers during lamination, it is necessary that one of the two partial catalyst layers is in a non-dried stage. More specifically, the invention is directed to a method for manufacturing a catalyst coated membrane comprising the steps of:

coating a substrate with a first catalyst dispersion thereby obtaining a first catalyst dispersion coated substrate, providing a second side of a membrane with a support film, coating a first side of the membrane with a second catalyst dispersion, thereby obtaining a second catalyst dispersion coated first side of the membrane, drying the first catalyst dispersion thereby obtaining a first catalyst coated substrate or drying the second catalyst dispersion coated first side of the membrane thereby obtaining a second catalyst coated first side of the membrane, laminating the first catalyst coated substrate to the second catalyst dispersion coated first side of the membrane or laminating the first catalyst dispersion coated substrate to the second catalyst coated first side of the membrane so that the first catalyst and the second catalyst superimpose, thereby forming a laminate including a membrane comprising a first catalyst layer, drying the laminate, removing the support film from the second side of the membrane, coating a third catalyst dispersion on the second side of the membrane, drying the third catalyst dispersion, thereby obtaining a second catalyst layer on the membrane, and removing the substrate from the first catalyst coated substrate.

DETAILED DESCRIPTION OF THE INVENTION

Figure 1:
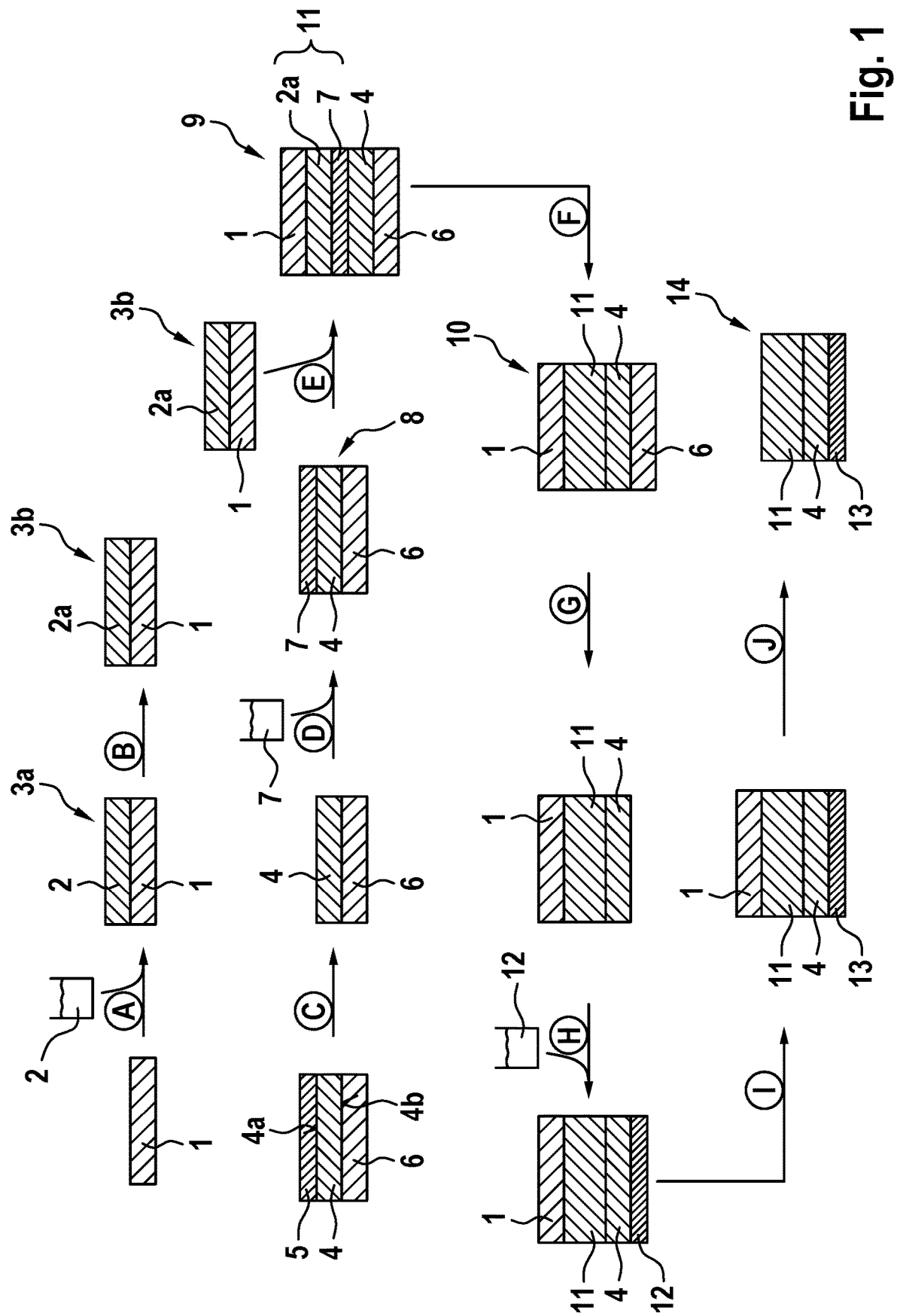
FIG. 1 is a process diagram illustrating an embodiment of the method of manufacturing a catalyst coated membrane.

In a first aspect of the present invention, the method comprises a first step of coating a substrate with a first catalyst dispersion. The first catalyst dispersion, which may also be called "catalyst ink", includes at least catalytically active particles, ionomer and a solvent. Other functional additives, like viscosity amending agents and the like, may be added. In a subsequent step, drying of the first catalyst dispersion provided on the substrate may be carried out to obtain a first catalyst coated substrate. Separately, a step of providing a second side of a membrane with a support film is carried out. This can be done for example by laminating a support film onto the second side of the membrane.

Alternatively, it is also possible to use a membrane which is already provided with a support film.

The membrane is not particularly limited and may be any suitable kind of membrane, such as an ion active membrane like e.g. a polymer electrolyte membrane and the like. After the support film is applied to the second side of the membrane, a coating step of coating a first side of the membrane with a second catalyst dispersion is carried out. Thereby a second catalyst dispersion coated first side of the membrane is obtained. Like the first catalyst dispersion, the second catalyst dispersion includes at least catalytically active particles, ionomer and a solvent. Other functional additives, like viscosity amending agents and the like, may be added. During this step of directly coating the second catalyst dispersion on the membrane, the support film stabilizes the membrane and prevents the membrane from coming off so that uncontrolled dimensional changes of the membrane, in particular under web tension, are prevented.

In a next step, the first catalyst coated substrate and the second catalyst dispersion coated first side of the membrane are laminated so that the first catalyst of the first catalyst coated substrate and the second catalyst of the second catalyst dispersion coated first side of the membrane superimpose.

In this first aspect of the inventive method, to achieve the required adhesion between the first catalyst and the second catalyst in the subsequent laminating step to be described below, it is essential that during the lamination step, the second catalyst dispersion which is coated directly on the first side of the membrane, is in a wet state, i.e. not dried, whereas the first catalyst dispersion provided on the substrate is in a dried state.

According to a second aspect of the inventive method, the method comprises a first step of coating a substrate with a first catalyst dispersion as outlined above. In contrast to the first aspect of the inventive method, the first catalyst dispersion provided on the substrate is not dried, whereby a first catalyst dispersion coated substrate is obtained in which the first catalyst dispersion is in a non-dried state.

Again, separately, a step of providing a second side of a membrane with a support film is carried out. This can be done for example by laminating a support film onto the second side of the membrane. Alternatively, it is also possible to use a membrane which is already provided with a support film.

The membrane is identical to the one described above. After the support film is applied to the second side of the membrane, a coating step of coating a first side of the membrane with a second catalyst dispersion is carried out. Thereby a second catalyst dispersion coated first side of the membrane is obtained. This step is identical to the respective step of the first aspect of the inventive method and the same advantageous effects are achieved. Subsequently, a drying step of drying the second catalyst dispersion provided on the first side of the membrane is carried out whereby a second catalyst coated first side of the membrane is obtained.

Therefore, in this second aspect of the inventive method, the second catalyst dispersion layer provided on the first side of the membrane is in a dried state whereas in the first aspect of the inventive method outlined above, the first catalyst dispersion layer provided on the substrate is in a dried-state. The respective other catalyst layer is in a non-dried state so that the following laminating step can be carried out easily:

In the laminating step, either the first catalyst coated substrate (dried state) and the second catalyst dispersion coated first side of the membrane (non-dried state) or the first catalyst dispersion coated substrate (non-dried state) and the second catalyst coated first side of the membrane (dried state) are laminated so that the first catalyst of the first catalyst layer and the second catalyst of the second catalyst layer superimpose.

Since in both cases one of the catalyst dispersion layers is in a non-dried state, i.e. in a wet state, high adhesion between the two partial catalyst layers of the first catalyst layer to be formed, is achieved and a laminate is formed which includes a membrane comprising a first catalyst layer. Additionally the substrate is present and the first catalyst layer is formed between the substrate and the membrane. Subsequently, the laminate is dried.

By the following steps a second catalyst layer is formed on the second side of the membrane. At first, the support film is removed from the second side of the membrane. This can be carried out easily as the support film is still one of the outermost layers of the laminate. After removal of the support film, the second side of the membrane is coated directly with a third catalyst dispersion. The third catalyst dispersion includes at least catalytically active particles, ionomer and a solvent. Other functional additives, like viscosity amending agents and the like, may be added. After a subsequent step of drying the third catalyst dispersion a second catalyst layer is formed on the membrane.

In a last step, the substrate which has been coated with a first catalyst dispersion in a first step, is removed from the laminate. Thereby a catalyst coated membrane is formed which contains the following layers in this order: first catalyst layer—membrane—second catalyst layer, wherein the first catalyst layer is formed from the first catalyst dispersion and the second catalyst dispersion.

The inventive method has the advantage that during each of the coating steps of coating catalyst dispersions on the membrane, which is the most critical step in light of dimensional changes in the membrane, the membrane is always supported by stabilizing layers. I.e., when directly coating the second catalyst dispersion, the membrane is supported by the support film. When coating the third catalyst dispersion on the membrane, the membrane is supported by the first catalyst layer including the first catalyst coated substrate and the layer including the layer of the second catalyst dispersion. Therefore, dimensional changes like formation of wrinkles and crinkles and the like, are prevented due to stabilization of the membrane. The inventive method further prevents from the formation of cracks in the catalyst layers and a catalyst coated membrane having high homogeneity and thus, high quality can be manufactured which guarantees for excellent performance. The inventive method for manufacturing the catalyst coated membrane can be carried out easily without using high technology in a short process time. The manufactured catalyst coated membrane can exemplarily be used for membrane electrode assemblies.

The sub-claims contain advantageous embodiments of the present invention.

According to an embodiment of the inventive method, the substrate is porous. The porosity, measured using $N_2$ sorption BJH method of DIN 66134 (Publication date: February 1998) ranges preferably from 20 to 90% and more preferably from 40 to 70%.

Further preferable, an average pore size of the substrate ranges from 30 nm to 300 nm. Thus, the drying of the first catalyst dispersion provided on the substrate can be carried out with a high rate easily and homogeneously. The average pore size can be determined using $N_2$ sorption BJH method of DIN 66134 (Publication date: February 1998).

The substrate to which the first catalyst dispersion is coated is not particularly limited. Preferable substrates are selected from the group consisting of: porous ceramic substrates and composites thereof, expanded polytetrafluoroethylene, polyethylene terephthalate, and polypropylene. These polymer materials provide excellent priming properties.

According to a further embodiment the substrate is surface treated. By surface treating the substrate the coating and release properties can be improved. Preferably, plasma treatment or silicone coating are carried out.

Further advantageously, coating of the substrate with the first catalyst dispersion is preferably carried out using e.g. a doctor blade, a slot die, curtain coating, or rotary sieve printing. Therewith a homogeneous coating layer can be applied which guarantees for a smooth surface, thus, improving the lamination of the first catalyst coated substrate to the second catalyst dispersion coated first side of the membrane. Furthermore, surface defects in the catalyst layer, like cracks, can be prevented.

The application of the first catalyst dispersion on a substrate makes it possible to store the first catalyst coated substrate prior to further processing. Preferably the first catalyst coated substrate is rolled for storage. By rolling the first catalyst coated substrate on a roller, handling of the coated substrate can be facilitated.

The concentration of the catalyst in each of the catalyst dispersions is not particularly limited. However, according to a further preferred embodiment the total amount of the first catalyst in the first catalyst dispersion and the second catalyst in the second catalyst dispersion is chosen to correspond to the total catalyst loading amount which should be provided in the first catalyst layer. The concentration of the catalyst can be the same or can be different. By using different concentrations of catalysts in the first and second catalyst dispersions, a concentration gradient can be introduced into the first catalyst layer.

To more easily prevent wrinkling of the membrane and cracks in the dried first catalyst layer, a total maximum amount of solvent of the second catalyst dispersion per area of the first side of the membrane to be coated is 4 $g/m^2$ to 21 $g/m^2$ and/or a mass ratio of solvent in the second catalyst dispersion to the membrane is 0.14 g/g to 0.21 g/g respectively.

According to the excellent coating and release properties, the support film is preferably selected from the group consisting of: polyethylene terephthalate or polyethylene naphthalate.

The membrane may be a free-standing membrane when processing the membrane by supporting a second side of a membrane on a support film. However, according to a further preferred embodiment, the membrane includes a cover layer on the first side of the membrane for stabilizing the membrane. Furthermore, such a cover layer prevents the membrane from becoming soiled during storage and handling. When the membrane is covered with a cover layer, prior to coating the first side of the membrane with the second catalyst dispersion, the cover layer is removed.

For improving flatness and adhesion between the first catalyst coated substrate and the second catalyst dispersion, the laminating step of laminating the first catalyst coated substrate to the second catalyst dispersion coated first side of the membrane or the laminating step of laminating the first catalyst dispersion coated substrate to the second catalyst coated first side of the membrane preferably includes a step of calendering.

Further advantageously, the method comprises a step of supporting a carrier film on the surface of the second catalyst layer before removing the substrate. Such carrier film prevents from soiling and protects the first catalyst layer and the second catalyst layer, e.g. during storage or transport. In particular, when preparing the membrane coated on its first side with a second catalyst dispersion and on its second side with a third catalyst dispersion, and said membrane is rolled for storage or transport, the second and third catalyst dispersions (or catalyst layers, in case a drying of the catalyst dispersion has been carried out) do not get in contact with each other.

Provided herewith are the following Examples and Comparative Examples for illustrating the effects obtained by applying the inventive method.

Example 1

A catalyst ink for anode and cathode electrode with the following composition is used for producing a catalyst coated membrane (CCM) according to the process of the present invention:

10.0 g Pt-supported catalyst (20 wt. % Pt on graphitized Vulcan XC72)
28.6 g commercial Nafion® dispersion D-2020
26.0 g Water (fully deionized)
35.4 g 1-Propanol In a first step according to the present invention a porous polypropylene substrate is coated with the catalyst ink by applying an amount of a wet electrode layer of 50.25 $g/m^2$ and finally the applied wet electrode layer is dried in an oven to remove the solvents.

In a next step a supported perfluorosulfonic acid (PFSA) polymer electrolyte membrane, which contains on its second side a support-foil, is coated directly on its first side with the catalyst ink by applying an amount of the wet electrode layer of 25.13 $g/m^2$. The thickness of the PFSA polymer electrolyte membrane without support is 15 µm. The supported PFSA polymer electrolyte membrane could also contain a cover foil on its first side, which has to be removed firstly before coating the first side of the supported PFSA polymer electrolyte membrane.

After coating the first side of the supported PFSA polymer electrolyte membrane, the porous polypropylene substrate is applied with its already dried electrode layer (Pt-loading of 0.10 mgPt/cm$^2$) directly onto the still wet electrode layer of the supported PFSA polymer electrolyte membrane in a way that dried and wet electrode layer superimpose. In a next step, this composite (laminate) is dried in an oven to remove the solvents of the wet electrode. After the drying, the composite contains a dried electrode layer with a Pt-loading of total 0.15 mgPt/cm$^2$.

In a next step, the support-foil of the PFSA polymer electrolyte membrane of the composite is removed and the second side of the PFSA polymer electrolyte membrane is coated directly with the catalyst ink by applying an amount of wet electrode layer of 25.13 g/m$^2$. The composite is finally dried in an oven to remove the solvents of the wet electrode layer.

In a further step, a process foil is laminated directly onto the already dried second electrode layer (Pt loading of 0.05 mg/cm$^2$) of the composite.

In a next step, the porous polypropylene substrate of the composite is removed from the first electrode layer and finally a catalyst coated membrane (CCM) on a process foil is obtained.

Example 2

A catalyst ink for anode and cathode electrode with the following composition was used for producing a catalyst coated membrane (CCM) according to the process of the present invention:

10.0 g Pt-supported catalyst (20 wt. % Pt on graphitized Vulcan XC72)
28.6 g commercial Nafion® dispersion D-2020
26.0 g Water (fully deionized)
35.4 g 1-Propanol In a first step according to the present invention, a porous polypropylene substrate is coated with the catalyst ink by applying an amount of a wet electrode layer of 25.13 g/m$^2$. A supported PFSA polymer electrolyte membrane, which is supported on its second side, is applied with its first side onto the still wet electrode layer of the porous polypropylene substrate to form a composite. The thickness of the PFSA polymer electrolyte membrane without support foil is 15 µm. It is possible that the supported PFSA polymer electrolyte membrane contains a cover-foil on its first side, which has to be removed firstly before applying the supported PFSA polymer electrolyte membrane. The composite is finally dried in an oven to remove the solvents of the wet electrode layer.

In a next step, the support foil of the supported PFSA polymer electrolyte membrane of the composite is removed and the second side of the PFSA polymer electrolyte membrane is coated directly with the catalyst ink by applying an amount of wet electrode layer of 75.34 g/m$^2$. The composite is finally dried in an oven to remove the solvents of the wet electrode layer.

In a further step, a process foil is laminated directly onto the already dried second electrode layer of the composite.

In a next step, the porous polypropylene substrate of the composite is removed from the first electrode layer and finally a catalyst coated membrane (CCM) on a process foil is obtained.

Comparative Example 1

A catalyst ink for anode and cathode electrode with the same composition compared to Examples 1 and 2 is used according to a comparative process, which leads to cracks in the electrode layer and leads to wrinkles/detachment of the supported PFSA polymer electrolyte membrane from its support-foil:

10.0 g Pt-supported catalyst (20 wt. % Pt on graphitized Vulcan XC72)
28.6 g commercial Nafion® dispersion D-2020
26.0 g Water (fully deionized)
35.4 g 1-Propanol In a first step according to the comparative process a supported PFSA polymer electrolyte membrane which contains on its second side a support foil is coated on its first side with the catalyst ink by applying an amount of 30.2 g/m$^2$. In another trial an amount of 125.6 g/m$^2$ of catalyst ink is applied in the same manner. The thickness of the PFSA polymer electrolyte membrane without support foil is 15 µm. In the case of an existing cover foil on the first side of the supported PFSA polymer electrolyte membrane this cover foil has to be removed firstly before coating the first side of the supported PFSA polymer electrolyte membrane. Before drying the wet electrode layer, a detachment of the PFSA polymer electrolyte membrane from its support foil occurs immediately for both amounts of 30.2 g/m$^2$ and 125.6 g/m$^2$ of catalyst ink and thus wrinkles of the PFSA polymer electrolyte membrane are formed. Finally, the wet electrode layer on the first side of the supported PFSA polymer electrolyte membrane is dried in an oven to remove the solvents. After drying the dried electrode layer, which is obtained from 125.6 g/m$^2$ catalyst ink, shows crack formation in the electrode layer as well as the electrode layer, which is obtained from 30.2 g/m$^2$ catalyst ink. The wrinkles of the PFSA polymer electrolyte membrane remains after drying.

A homogenous lamination of a process foil directly onto the dried electrode of the first side of the supported PFSA polymer electrolyte membrane is not possible because of the wrinkles formed by the PFSA polymer electrolyte membrane.

Comparative Example 2

A catalyst ink for anode and cathode electrode with the same composition compared to Examples 1 and 2 is used according to a comparative process which leads to wrinkles/detachment of the supported PFSA polymer electrolyte membrane from its support foil:

10.0 g Pt-supported catalyst (20 wt. % Pt on graphitized Vulcan XC72)
28.6 g commercial Nafion® dispersion D-2020
26.0 g Water (fully deionized)
35.4 g 1-Propanol In a first step according to the present invention, a porous polypropylene substrate is coated with the catalyst ink by applying an amount of a wet electrode layer of 125.6 g/m$^2$. A supported PFSA polymer electrolyte membrane, which is supported on its second side, is applied with its first side onto the still wet electrode of the porous polypropylene substrate to form a composite. The thickness of the PFSA polymer electrolyte membrane without support foil is 15 µm. It is possible that the supported PFSA polymer electrolyte membrane contains a cover foil on its first side, which has to be removed firstly before applying the supported PFSA polymer electrolyte membrane.

Before drying the wet electrode layer of the composite, a detachment of the PFSA polymer electrolyte membrane from its support foil occurs immediately and thus wrinkles of the PFSA polymer electrolyte membrane are formed.

Finally, the wet electrode layer of the composite is dried in an oven to remove the solvents and after drying the electrode layer shows no crack formation but the wrinkles of the PFSA polymer electrolyte membrane remain.

After removing the support foil of the supported PFSA polymer electrolyte membrane of the composite it is not possible by applying the catalyst ink to coat a homogenous wet electrode layer directly onto the second side of the PFSA polymer electrolyte membrane because of the remaining wrinkles of the PFSA polymer electrolyte membrane.

The present invention further concerns a device for manufacturing a catalyst coated membrane. The device includes a first process unit, a second process unit and a third process unit. These process units may be provided as separate process units or may be implemented as one process unit.

The first process unit comprises: i) a substrate feeding unit for feeding and transporting a substrate. As an example, the substrate may be provided on a roller and may be unwound during the feeding and transporting process. The first process unit further comprises ii) a first catalyst dispersion coating unit for coating a first catalyst dispersion onto a first side of the substrate, to obtain a first catalyst dispersion coated substrate, By use of the first processing unit a first catalyst dispersion coated substrate can be manufactured with high preciseness.

The second process unit comprises i) a membrane feeding unit for feeding and transporting a membrane, like e.g. a polymer electrolyte membrane. Such membrane feeding unit may be a roller on which the membrane is rolled for storage. When feeding the membrane from a roller, the membrane is unwound from the roller and transported to the next unit. The second process unit further comprises ii) a support film feeding unit for feeding a support film. The support film is fed to the membrane and in iii) a support film laminating unit the support film is laminated onto a second side of the membrane. Thereby the membrane is stabilized in its dimensions. In the second process unit iv) a second catalyst dispersion coating unit is provided for coating a second catalyst dispersion onto a first side of the membrane which is not covered, to obtain a second catalyst dispersion coated first side of the membrane.

Either the first process unit or the second process unit includes a drying unit. The drying unit may be for example an oven or a heating element. In case the drying unit is provided in the first process unit, said drying unit is for drying the first catalyst dispersion to obtain a first catalyst coated substrate. In case the drying unit is provided in the second process unit, the drying unit is used for drying the second catalyst dispersion coated first side of the membrane to obtain a second catalyst coated first side of the membrane.

The second process unit further includes v) a laminating unit for laminating the first catalyst coated substrate manufactured in the first process unit and the second catalyst dispersion coated first side of the membrane or for laminating the first catalyst dispersion coated substrate to the second catalyst coated first side of the membrane so that the first catalyst and the second catalyst superimpose. Accordingly, two (partial) catalyst containing layers are joined together, thereby forming one single first catalyst layer. Consequently, in the laminating unit a laminate is formed including a first catalyst layer provided on the membrane, wherein in other words, the first catalyst layer is sandwiched by the membrane on its one side and by the substrate on its other side.

As a further unit, the second process unit comprises vi) a drying unit for drying the laminate. The drying unit may be for example an oven or a heating element. The second process unit further includes vii) a first removing unit for removing the support film from the second side of the membrane. This is essential for preparing a second membrane surface for coating. In the second process unit a first catalyst layer is provided in the membrane, whereby the membrane is supported during the step of coating the second catalyst dispersion and laminating the first catalyst coated substrate. Thereby, formation of wrinkles in the membrane and cracks in the first catalyst layer are prevented.

It is to be noted that the first removing unit for removing the support film from the second side of the membrane may also form part of the third process unit described below or a separate process unit.

The third process unit comprises i) a third catalyst dispersion coating unit for coating a third catalyst dispersion onto the second side of the membrane. During this step, the membrane is still supported and stabilized in its dimensions by the first catalyst layer provided on the first side of the membrane and the substrate. Thereby during the direct coating of the third catalyst dispersion formation of wrinkles in the membrane can be prevented. ii) A drying unit for drying the third catalyst dispersion is provided subsequent to the third catalyst dispersion coating unit. In the drying unit the third catalyst dispersion is dried. As the drying unit an oven or a heating element may be provided appropriately. The third process unit further comprises iii) a second removing unit for removing the substrate from the first catalyst coated substrate, whereby the catalyst coated membrane is obtained which may be stored in iv) a storing unit. As an example, the storing unit may be a roller on which the catalyst coated membrane is rolled.

The inventive device makes it possible to manufacture a membrane coated on both sides with catalyst layers, i.e. a first catalyst layer and a second catalyst layer sandwiching the membrane. When coating the membrane with the second or third catalyst dispersion, the membrane is supported throughout the whole process so that the formation of wrinkles in the membrane and also cracks in the catalyst layers can be prevented. Also detachment of the membrane from the support film is prevented. No dimensional changes form in the membrane and the catalyst coated membrane shows excellent performance and stability.

Furthermore, the inventive device is capable of producing catalyst coated membranes showing a different constitution and arrangement of the layers. Accordingly, barrier layers, adhesive layers and other functional layers may be incorporated into the catalyst coated membrane where appropriate.

The advantages and preferable embodiments disclosed with respect to the inventive method of manufacturing a catalyst coated membrane are also applicable for the inventive device for manufacturing a catalyst coated membrane.

According to a preferable embodiment of the inventive device, the second process unit includes a cover layer removing unit between the support film laminating unit and the second catalyst dispersion coating unit for removing a cover layer provided on the first side of the membrane.

For improving the quality of the catalyst coated membrane, at least one of the first, second and third process unit includes at least one cleaning unit and/or inline control unit.

Additionally, a carrier film feeding unit for supporting a carrier film on the surface of the second catalyst layer before removing the substrate may advantageously be provided so that the first catalyst layer and second catalyst layer are not in contact to each other during storage of the catalyst coated membrane as a roll and the catalyst coated membrane on an appropriate carrier film can be used as an input for the next process unit to prepare a membrane electrode assembly (MEA).

The present invention will now be described with reference to the figures. Throughout the figures only essential aspects of the present invention are mentioned. Other aspects have been omitted for sake of clarity. In the figures same reference sign denominate same elements.

In Detail, FIG. 1 illustrates a process diagram for manufacturing a catalyst coated membrane 14 according to an embodiment of the present invention.

In a first process line, a substrate 1 is provided which is preferably a porous substrate formed of expanded polytetrafluorethylene, polyethylene terephthalate, and polypropylene. In step A) a first catalyst dispersion 2 including at least catalytically active particles, ionomer and a solvent and, if applicable, other additives, is prepared and applied to one surface of the substrate 1 to coat the substrate 1. A first catalyst dispersion coated substrate 3a is obtained which is subsequently dried in step B), whereby a first catalyst coated substrate 3b is obtained including the substrate 1 and a layer of the first catalyst dispersion 2a.

In a second process line, a membrane 4 is provided. The membrane 4 has a first side 4a and a second side 4b. On the first side of the membrane 4a a cover layer 5 is provided which protects the membrane 4 from pollution. On the second side of the membrane 4b a support film 6 is provided which has been applied to the membrane 4 in a previous step (not shown).

In step C) the cover layer 5 is removed from the first side of the membrane 4a. Subsequently, in step D) a second catalyst dispersion 7 including catalytically active particles, ionomer and a solvent and, if applicable, other additives, is coated on the first side of the membrane 4a to cover the membrane. Thereby a second catalyst dispersion coated first side of the membrane 8 is obtained. During the coating step of coating the second catalyst dispersion 7, the membrane 4 is supported and dimensionally stabilized by the support film 6. This guarantees for a wrinkle-free coating of the membrane 4 without dimensionally changing the membrane 4.

In the following laminating step E), the second catalyst dispersion 7 applied to the first side of the membrane 4a is still in a non-dried state. Step E) illustrates the laminating of the first catalyst coated substrate 3 and the second catalyst dispersion coated first side of the membrane 8 so that the first catalyst of the first catalyst coated substrate 3b and the second catalyst of the second catalyst dispersion coated first side of the membrane 8 superimpose, thereby forming a laminate 9 including a membrane 4 comprising a first catalyst layer 11 formed of the layer of the first catalyst dispersion 2a and the layer of the second catalyst dispersion coated on the first side of the membrane. The lamination can be improved by calendering.

Subsequently in step F) the laminate is dried, thereby obtaining a dried laminate 10. Thereby the layer of the first catalyst dispersion 2a and the second catalyst dispersion coated first side of the membrane 8 are fused.

In step G) the support film 6 is removed from the second side of the membrane 4b, thereby exposing the second side of the membrane 4b. Subsequently, in step H) a third catalyst dispersion 12 including at least catalytically active particles, ionomer and a solvent and, if applicable, other additives, is coated on the second side of the membrane 4b. During this coating step the membrane 4 is stabilized by the first catalyst layer 11 and the substrate 1, whereby dimensional changes of the membrane 4 can be prevented.

In step I) the third catalyst dispersion is dried, thereby obtaining a second catalyst layer 13 on the membrane (4).

After removal of the substrate 1 from the first catalyst coated substrate 3 forming part of the first catalyst layer 11 in step J), the catalyst coated membrane 14 is obtained.

The catalyst coated membrane 14 is provided with a first catalyst layer 11 on one side of the membrane 4 and a second catalyst layer 13 on the opposite side of the membrane 4. Accordingly, the first catalyst layer 11 and the second catalyst layer 13 are sandwiching the membrane 4. The catalyst coated membrane 14 can be used for manufacturing a membrane electrode assembly, e.g. for fuel cell applications, and has excellent performance and stability.

Figure 2:
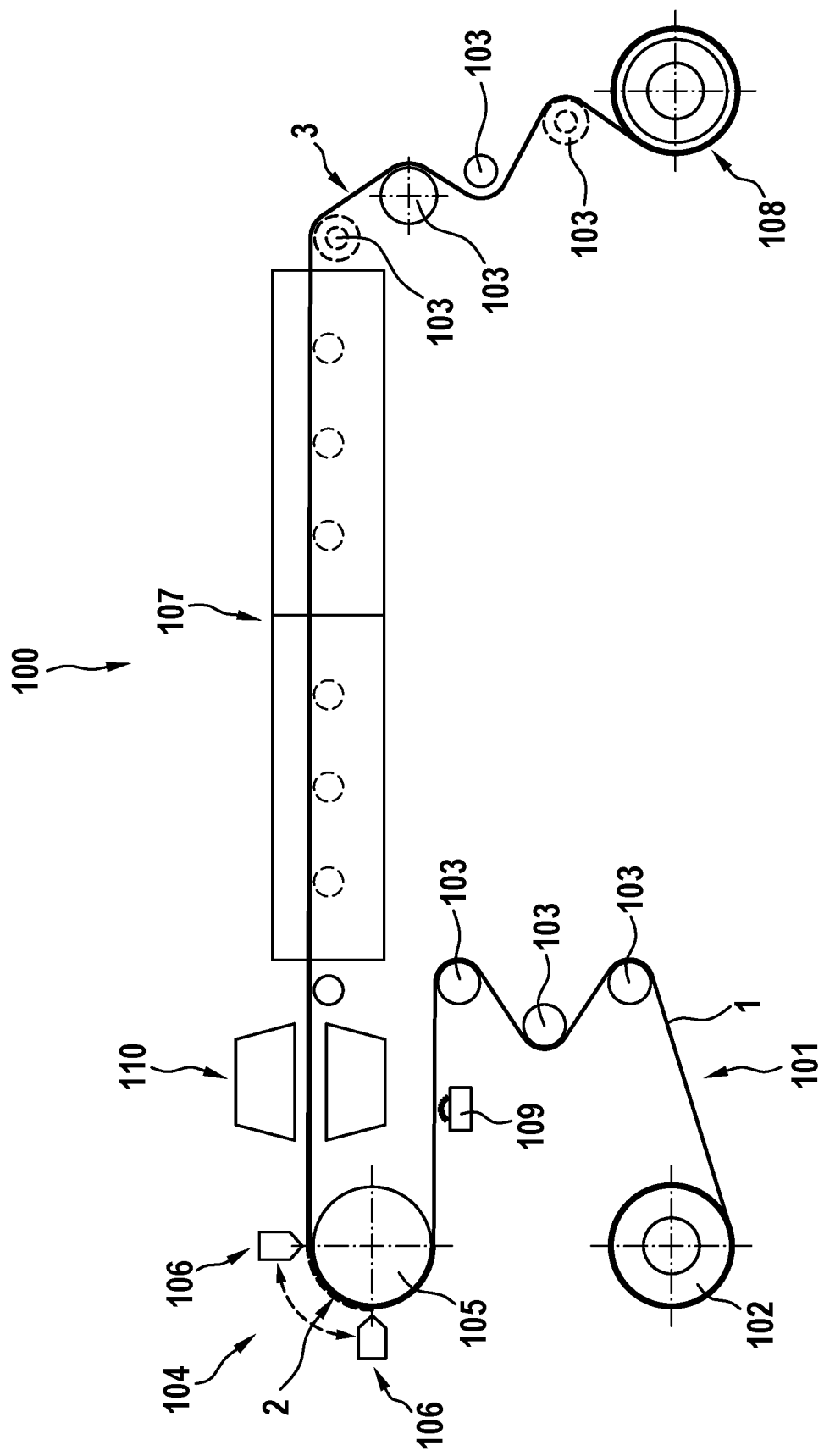
FIG. 2 illustrates a first process unit according to an embodiment of the inventive device.

FIG. 2 shows a first process unit 100 forming part of a device for manufacturing a catalyst coated membrane according to an embodiment of the present invention.

In process unit 1 a (porous) substrate 1 is fed from a substrate feeding unit 101 including a substrate roller 102 and supporting rollers 103 for feeding and transporting the substrate 1. In particular, the substrate 1 is unwound from substrate roller 102, supported by supporting rollers 103, cleaned by cleaning unit 109 and guided to a first catalyst dispersion coating unit 104 for coating a first catalyst dispersion 2 onto a first side of the substrate 1, to obtain a first catalyst dispersion coated substrate 3a. The first catalyst dispersion coating unit (104) may comprise a coating roller 105 and a slot die 106. Subsequent to a further provided inline control unit 110, a drying unit 107 for drying the first catalyst dispersion 2 is provided further subsequent to the first catalyst dispersion coating unit 104. Hereafter a first catalyst coated substrate 3b is obtained which is guided via supporting rollers 103 to storing roller 108.

The first process unit 100 may be used for carrying out process steps A) and B) of FIG. 1.

Figure 3:
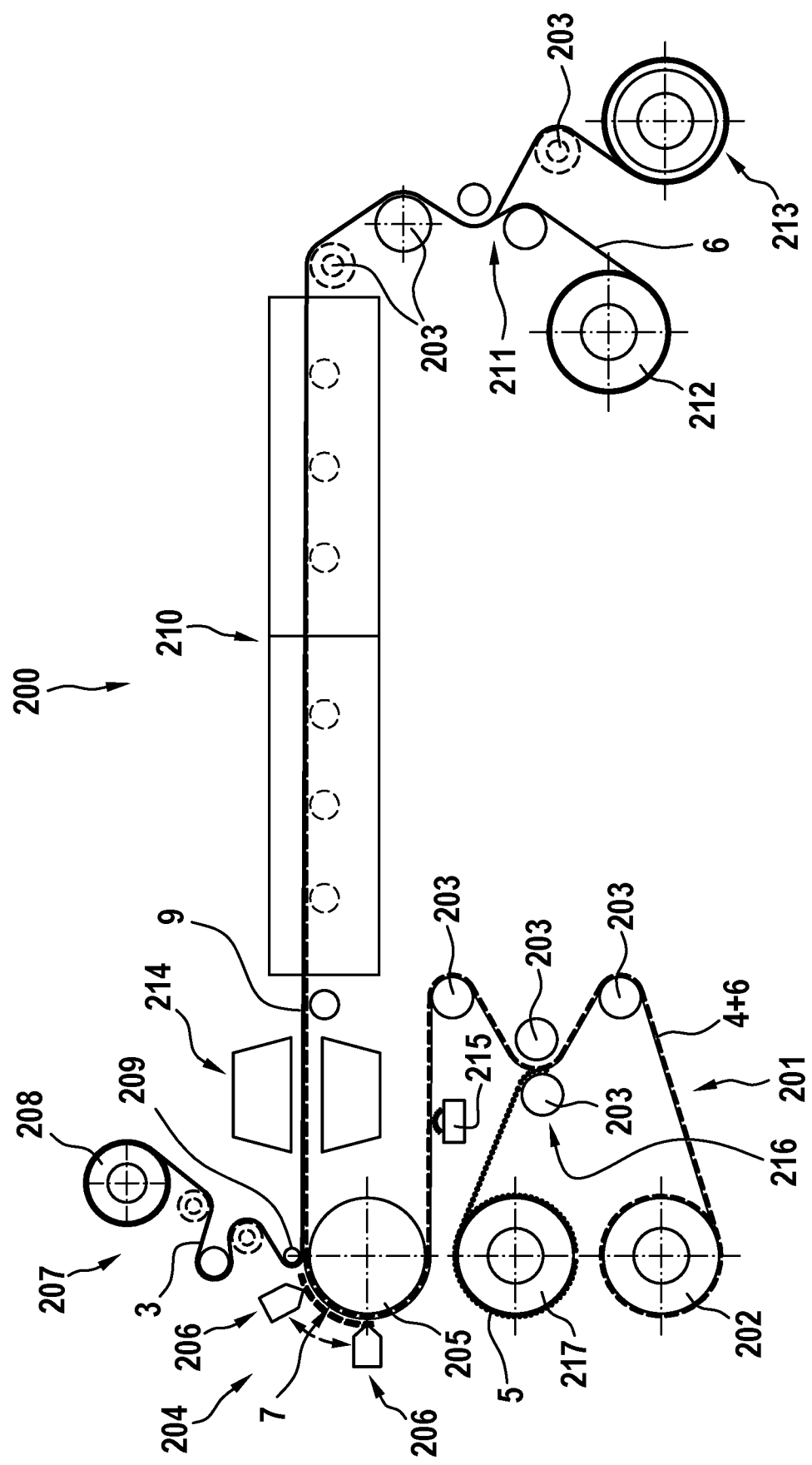
FIG. 3 illustrates a second process unit according to an embodiment of the inventive device.

FIG. 3 shows an embodiment of a second process unit 200. The second process unit 200 includes a membrane feeding unit 201 including a membrane roller 202 and supporting rollers 203 for feeding and transporting a membrane 4. A cleaning unit 209 is provided for cleaning the membrane 4. The membrane 4 used is already provided with a support film 6 covering a second side of the membrane 4b. Therefore, a support film feeding unit for feeding the support film 6 and a support film laminating unit for laminating the support film 6 onto a second side of the membrane 4b are not shown in FIG. 3 but may form part of the second process unit or may form part of a separate process unit. Subsequent to cleaning unit 215 a second catalyst dispersion coating unit 204 for coating a second catalyst dispersion 7 onto a first side of the membrane 4a to obtain a second catalyst dispersion coated first side of the membrane 8 is provided. The second catalyst dispersion coating unit 204 includes a coating roller 205 and a slot die 206 for applying the second catalyst dispersion 7.

The membrane may be covered with a cover foil 5. In such case a removing unit 216 and a roller 217 for unwinding of cover foil 5 of membrane 4 may be provided prior to second catalyst dispersion coating unit 204.

From feeding unit 207 the first catalyst coated substrate 3b obtained in the first process unit 100 is provided. The first catalyst coated substrate 3b is fed from storing roller 208 and supported via supporting roller 203 to laminating unit 209. At laminating unit 209 the first catalyst coated substrate 3 and the second catalyst dispersion coated first side of the membrane 8 are laminated so that the first catalyst of the first catalyst coated substrate 3 and the second catalyst of the second catalyst dispersion coated first side of the membrane 8 superimpose, thereby forming a laminate including a first catalyst layer on the membrane. An inline control unit 214 is provided for controlling the quality of the laminate. In a subsequent drying unit 210 the laminate is dried.

After drying, the dried laminate is guided to a removing unit 211 for removing the support film 6 from the second side of the membrane. The removing unit 211 includes roller 212 for rolling up the separated support film. The membrane coated with the first catalyst layer is stored in storing unit 213, which may be in form of a roller.

Figure 4:
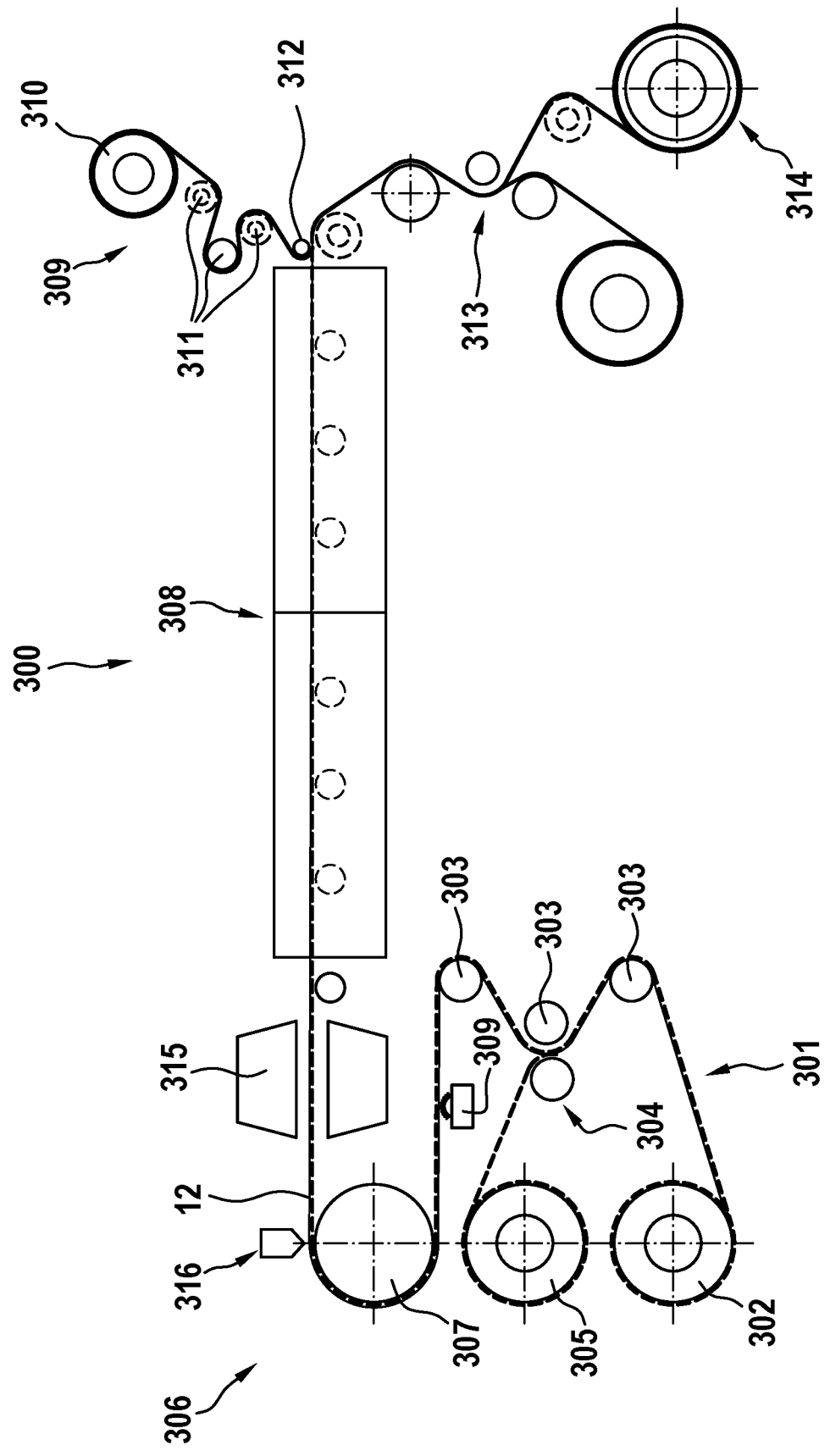
FIG. 4 illustrates a third process unit according to an embodiment of the inventive device.

FIG. 4 shows an embodiment of a third process unit 300. The third process unit 300 comprises a feeding unit 301 including a roller 302 on which the membrane coated with the first catalyst layer is stored and supporting rollers 303 for supporting and transporting. A first removing unit 304 for removing the support film 6 from the second side of the membrane is provided between roller 303 and cleaning unit 317. Here, the support film 6 is separated from the second side of the membrane and rolled on a roller 305.

Further provided is a third catalyst dispersion coating unit 306 for coating a third catalyst dispersion onto the second side of the membrane. The third catalyst dispersion coating unit 306 includes a coating roller 307 and a slot die 316 for applying the third catalyst dispersion 12. An inline control unit 315 is provided prior to a drying unit 308. In the subsequent drying unit 308, the third catalyst dispersion 12 is dried on the membrane, whereby a membrane coated with a second catalyst layer is formed. Subsequent to the drying unit 308 a carrier film feeding unit 309 is provided for supporting and laminating a carrier film to the surface of the second catalyst layer, including feeding roller 310, supporting roller 311 and laminating roller 312. The carrier film protects the surface of the second catalyst layer to come in contact with the first catalyst layer when the catalyst coated membrane is winded up. A second removing unit 313 for removing the substrate 1 from the first catalyst coated substrate which forms part of the first catalyst layer, is provided. This second removing unit 313 may alternatively be provided in a separate device. A storing unit 314 in form of a roller is installed for storing the catalyst coated membrane 14.

Figure 5:
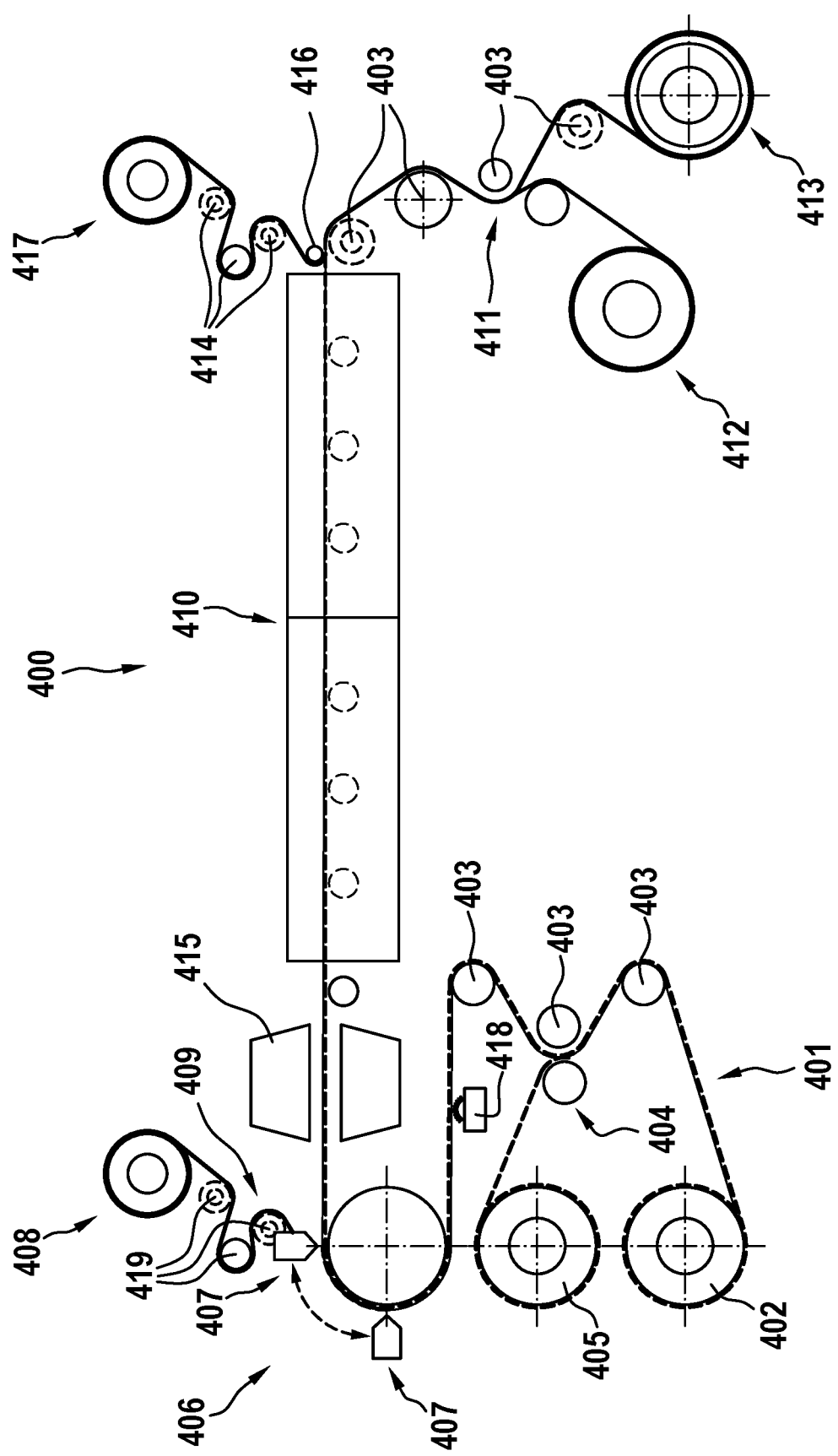
FIG. 5 illustrates a multi-unit device for manufacturing a catalyst coated membrane according to a further embodiment.

FIG. 5 shows a multi-unit device for manufacturing a catalyst coated membrane 400 according to a further embodiment. With this one multi-unit device, a catalyst coated membrane can be prepared easily. The multi-unit device 400 combines most units which can be used separately in each of the different process steps outlined in the foregoing Figures. Accordingly, the multi-unit device 400 can be used in a plurality of single process steps necessary for preparing the catalyst coated membrane of the present invention.

When using the multi-unit device 400 in a first process step, roller 402 stores a substrate. Said substrate is unwound from roller 402 and fed via feeding unit 401 and passing supporting rollers 403 via cleaning unit 418 to catalyst coating unit 406. At catalyst coating unit 406 a first catalyst dispersion is coated using slot dies 407 onto the surface of the substrate. After passing inline control unit 415 the first catalyst dispersion coated substrate is passed through drying unit 410, where the first catalyst dispersion is dried to obtain a first catalyst coated substrate. Said first catalyst coated substrate is supported by supporting rollers 403 and rolled for storage at storing unit 413. In this case, storing unit 413 is a roller.

When using the multi-unit device 400 in a second process step, roller 402 stores a support film which is unwound from roller 402 and supported by supporting rollers 403. The support film may be covered with a protection layer. In this case the protection layer may be removed at removing unit 404 and the removed protection layer can be rolled for storage on roller 405. The uncovered support film is passed through cleaning unit 418 and transferred to laminating unit 409. From storing roller 408 a membrane is unwound and supported via supporting rollers 419 to laminating unit 409. At laminating unit 409 the support film is laminated to a second side of the membrane so that both layers adhere to each other. After passing inline control unit 415, the adhesion between the second side of the membrane and the support film can be improved by heating the laminated layers in drying unit 410. From feeding roller 417 a cover foil may be unwound and transferred via supporting rollers 414 to laminating roller 416. At laminating roller 416 the cover foil and the laminate formed of the second side of the membrane and the support film are laminated to form a three-layer-laminate comprising a membrane covered on its first side with a cover foil and covered on its second side with a support film. The laminate is supported via supporting rollers 403 and rolled for storage at storing unit 413.

When using the multi-unit device 400 in a third process step, the laminate including the membrane, the cover foil and the support film is provided on roller 402 and fed from feeding unit 401. At removing unit 404 the cover foil is removed from the laminate and rolled for storage on roller 405. The membrane coated with a support film on its second side is supported by supporting rollers 403, passed through cleaning unit 418 and transferred to catalyst coating unit 406. Via slot dies 407 a second catalyst dispersion is coated on the first side of the membrane to obtain a second catalyst dispersion coated first side of the membrane. From storing roller 408 the first catalyst coated substrate obtained in the first process step is unwound and supported via supporting rollers 419 to laminating unit 409. At laminating unit 409 the first catalyst coated substrate is laminated to the second catalyst dispersion coated first side of the membrane so that the first catalyst and the second catalyst superimpose, thereby forming a laminate including a membrane comprising a first catalyst layer. In the laminating step the second catalyst dispersion is in a non-dried state which improves adhesion to the already dried first catalyst dispersion provided as a coating layer on the substrate. The obtained laminate is subsequently dried in drying unit 410, guided via supporting rollers 403 to storing unit 413. At storing unit 413 the laminate comprising the membrane and a first catalyst layer is rolled for storage.

When using the multi-unit device 400 in a fourth process step, roller 402 stores the laminate including the membrane, the first catalyst layer and the support film. Said laminate is fed from feeding unit 401 and supported by supporting rollers 403. At removing unit 404 the support film is removed from the laminate and the second side of the membrane is exposed. After cleaning in cleaning unit 418 the laminate is transferred to catalyst coating unit 406. At catalyst coating unit 406 the second side of the membrane is coated with a third catalyst dispersion. The coated membrane is then guided to drying unit 410 where the third catalyst dispersion is dried to form a second catalyst layer on the second side of the membrane. After passing the drying unit 410 a carrier foil may be unwound from feeding roller 417. Said carrier foil may then be laminated to the second catalyst layer using laminating roller 416. After supporting the membrane via supporting rollers 403 the substrate which covers the first catalyst layer is removed at removing unit 411 and rolled for storage on roller 412. The catalyst coated membrane is subsequently rolled for storage at storing unit 413.

The multi-unit device has high functionality and a catalyst coated membrane can be prepared easily without requiring a plurality of separate devices for each of the process steps. The different units of the multi-unit device 400 can be activated or deactivated as required in the respective process step. Therefore, the multi-unit device is space-saving.

Figure 6:
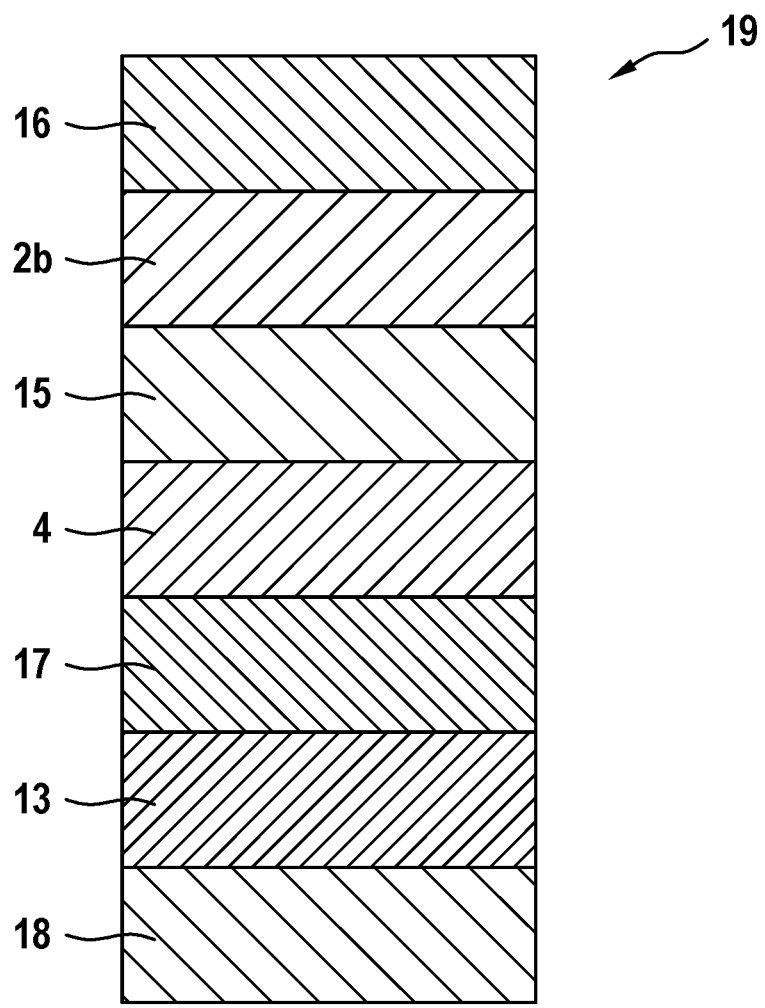
FIG. 6 shows a catalyst coated membrane obtained according to an embodiment of the inventive method.

FIG. 6 shows a catalyst coated membrane 19 obtained according to an embodiment of the inventive method. By use of the sandwich multilayer approach for DCM of the present invention, also other layer configurations are possible.

In particular, FIG. 6 shows the complete configuration of introducing alternative or additional functional layers, wherein the minimum configuration of the catalyst coated membrane is represented by the catalyst coated membrane 14 of FIG. 1. In the following, additional reference is made to the explanations of the process shown in FIG. 1.

For obtaining the catalyst coated membrane 19 including further functional layers as shown in FIG. 6, instead of using the second catalyst dispersion 7 in step D of FIG. 1, a first dispersion is used, e.g. for enhancing the adhesion of the first catalyst layer 11 to the first side of the membrane 4a.

After joining the first catalyst coated substrate 3b to the composite in step E and finally drying, the catalyst layer is still formed of the dried layer of the first catalyst dispersion 2b but the layer of the second catalyst dispersion 7 in FIG. 6 is a first functional layer 15.

Instead of using the third catalyst dispersion 12 in step H, a second dispersion is used, e.g. for enhancing the adhesion of the second catalyst layer 13 to the second side of the membrane 4b thereby obtaining a dried second functional layer 17.

The third catalyst dispersion 12 is coated directly onto the second functional layer 17 and finally dried to obtain a second catalyst layer 13.

After obtaining a composite consisting of substrate 1, the dried layer of the first catalyst dispersion 2b, the first functional layer 15, the membrane 4, the second functional layer 17, and the second catalyst layer 13, a third dispersion is coated directly onto the second catalyst layer 13 and finally dried to obtain a third functional layer 18 which can be a barrier layer.

To obtain layer 16 in FIG. 6, first a carrier film is applied to the third functional layer 18 and afterwards substrate 1 is removed from the dried layer of the first catalyst dispersion 2b.

A fourth dispersion is coated directly onto the dried layer of the first catalyst dispersion 2b and finally dried to obtain a fourth functional layer 16 which can be a barrier layer.

The carrier film is removed and the catalyst coated membrane 19 including additional functional layer is obtained.

LIST OF REFERENCE SIGNS 1 substrate
2 first catalyst dispersion
2a layer of the first catalyst dispersion
2b dried layer of the first catalyst dispersion
3a first catalyst dispersion coated substrate
3b first catalyst coated substrate
4 membrane
4a first side of the membrane
4b second side of the membrane
5 cover layer
6 support film
7 second catalyst dispersion
8 second catalyst dispersion coated first side of the membrane
9 laminate
10 dried laminate
11 first catalyst layer
12 third catalyst dispersion
13 second catalyst layer
14 catalyst coated membrane
15 first functional layer
16 fourth functional layer
17 second functional layer
18 third functional layer
19 catalyst coated membrane
100 first process unit
101 substrate feeding unit
102 substrate roller
103 supporting roller
104 first catalyst dispersion coating unit
105 coating roller
106 slot die
107 drying unit
108 storing roller
109 cleaning unit
110 inline control unit
200 second process unit
201 membrane feeding unit
202 membrane roller
203 supporting roller
204 second catalyst dispersion coating unit
205 coating roller
206 slot die
207 feeding unit
208 storing roller
209 laminating unit
210 drying unit
211 removing unit
212 roller
213 storing unit
214 inline control unit
215 cleaning unit
216 removing unit
217 roller
300 third process unit
301 feeding unit
302 roller
303 supporting roller
304 first removing unit
305 roller
306 third catalyst dispersion coating unit
307 coating roller
308 drying unit
309 carrier film feeding unit
310 feeding roller
311 supporting roller
312 laminating roller
313 second removing unit
314 storing unit
315 inline control unit
316 slot die
317 cleaning unit
400 multi-unit device for manufacturing a catalyst coated membrane
401 feeding unit
402 roller
403 supporting roller
404 removing unit
405 roller 406 catalyst coating unit
407 slot die
408 storing roller
409 laminating unit
410 drying unit
411 removing unit
412 roller
413 storing unit
414 supporting roller
415 inline control unit
416 laminating roller
417 feeding roller
418 cleaning unit
419 supporting roller

What is claimed is:

1. A method for preparing a catalyst coated membrane comprising the steps of:
    coating a substrate with a first catalyst dispersion thereby obtaining a first catalyst dispersion coated substrate,
    providing a second side of a membrane with a support film,
    coating a first side of the membrane with a second catalyst dispersion, thereby obtaining a second catalyst dispersion coated first side of the membrane,
    drying the first catalyst dispersion thereby obtaining a first catalyst coated substrate or drying the second catalyst dispersion coated first side of the membrane thereby obtaining a second catalyst coated first side of the membrane,
    laminating the first catalyst coated substrate to the second catalyst dispersion coated first side of the membrane, which has not been dried after coating, or laminating the first catalyst dispersion coated substrate, which has not been dried after coating, to the second catalyst coated first side of the membrane so that the first catalyst and the second catalyst superimpose, thereby forming a laminate including a membrane comprising a first catalyst layer, wherein during the lamination step, either the second catalyst dispersion, which is coated directly on the first side of the membrane, or the first catalyst dispersion provided on the substrate is in a wet state and not dried,
    drying the laminate,
    removing the support film from the second side of the membrane,
    coating a third catalyst dispersion on the second side of the membrane,
    drying the third catalyst dispersion, thereby obtaining a second catalyst layer on the membrane, and
    removing the substrate from the first catalyst coated substrate.

2. The method of claim 1, wherein the substrate is porous.

3. The method of claim 2, wherein an average pore size of the substrate ranges from 30 nm to 300 nm.

4. The method of claim 1, wherein the substrate is selected from the group consisting of: porous ceramic substrates and composites thereof, expanded polytetrafluorethylene, polyethylene terephthalate, and polypropylene.

5. The method of claim 1, wherein the substrate is surface treated.

6. The method of claim 5, wherein the substrate is surface treated using plasma treatment or silicone coating.

7. The method of claim 1, wherein the coating of the substrate with the first catalyst dispersion is carried out using a doctor blade, a slot die, curtain coating, or rotary sieve printing.

8. The method of claim 1, wherein the first catalyst coated substrate is rolled for storage.

9. The method of claim 1, wherein the total amount of the first catalyst in the first catalyst dispersion and the second catalyst in the second catalyst dispersion is chosen to correspond to the total catalyst loading amount in the first catalyst layer.

10. The method of claim 1, wherein a total maximum amount of solvent of the second catalyst dispersion per area of the first side of the membrane to be coated is 4 $g/m^2$ to 21 $g/m^2$.

11. The method of claim 1, wherein a mass ratio of solvent in the second catalyst dispersion to the membrane is 0.14 g/g to 0.21 g/g.

12. The method of claim 1, wherein the support film is polyethylene terephthalate or polyethylene naphthalate.

13. The method of claim 1, wherein the membrane comprises a cover layer on the first side thereof and wherein prior to coating the first side of the membrane with the second catalyst dispersion, the cover layer is removed.

14. The method of claim 1, wherein laminating the first catalyst coated substrate to the second catalyst dispersion coated first side of the membrane or laminating the first catalyst dispersion coated substrate to the second catalyst coated first side of the membrane comprises a step of calendering.

15. The method of claim 1, further comprising the step of supporting a carrier film on the surface of the second catalyst layer before removing the substrate.

* * * * *